E. E. ENGLUND.
CORN PLANTER.
APPLICATION FILED JULY 13, 1908.
918,983.
Patented Apr. 20, 1909.
2 SHEETS—SHEET 2.
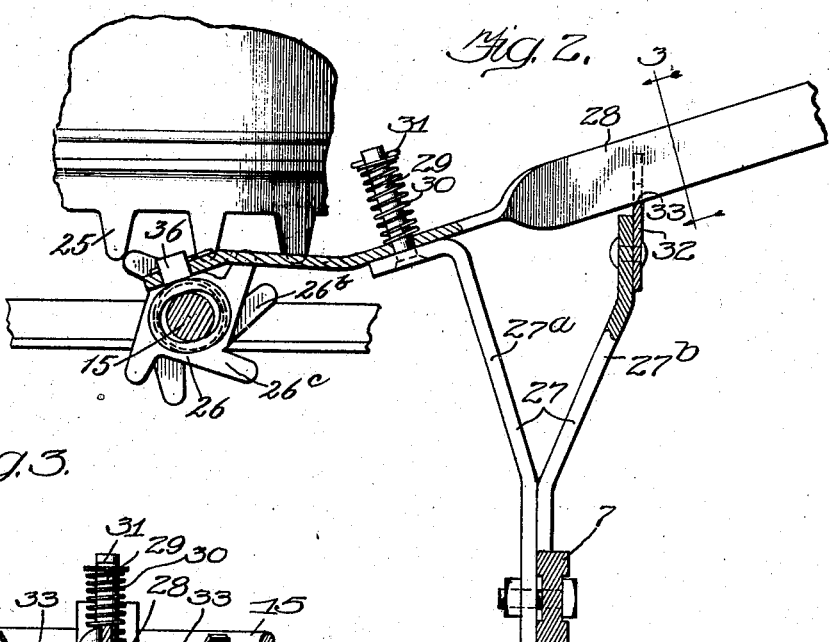
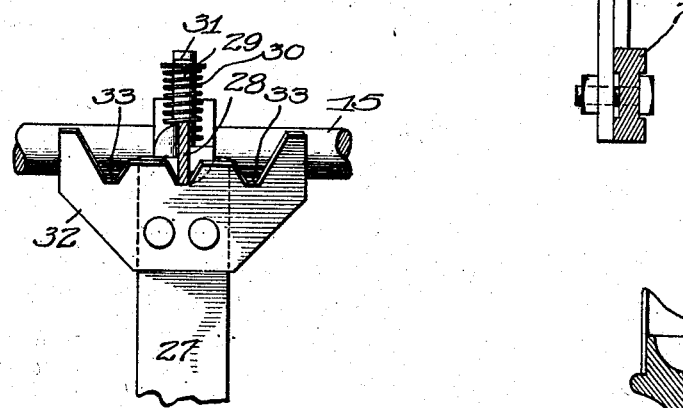
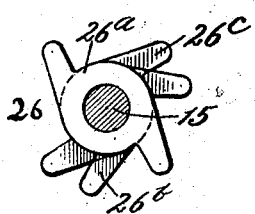
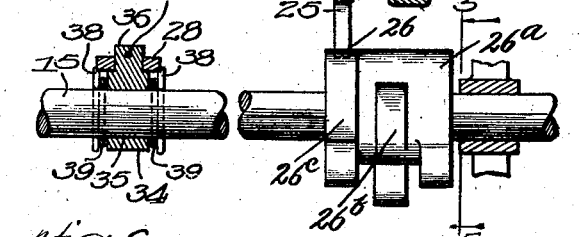
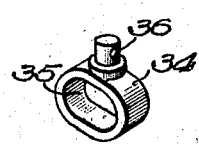
Witnesses:
Inventor:
Ernst E. Englund

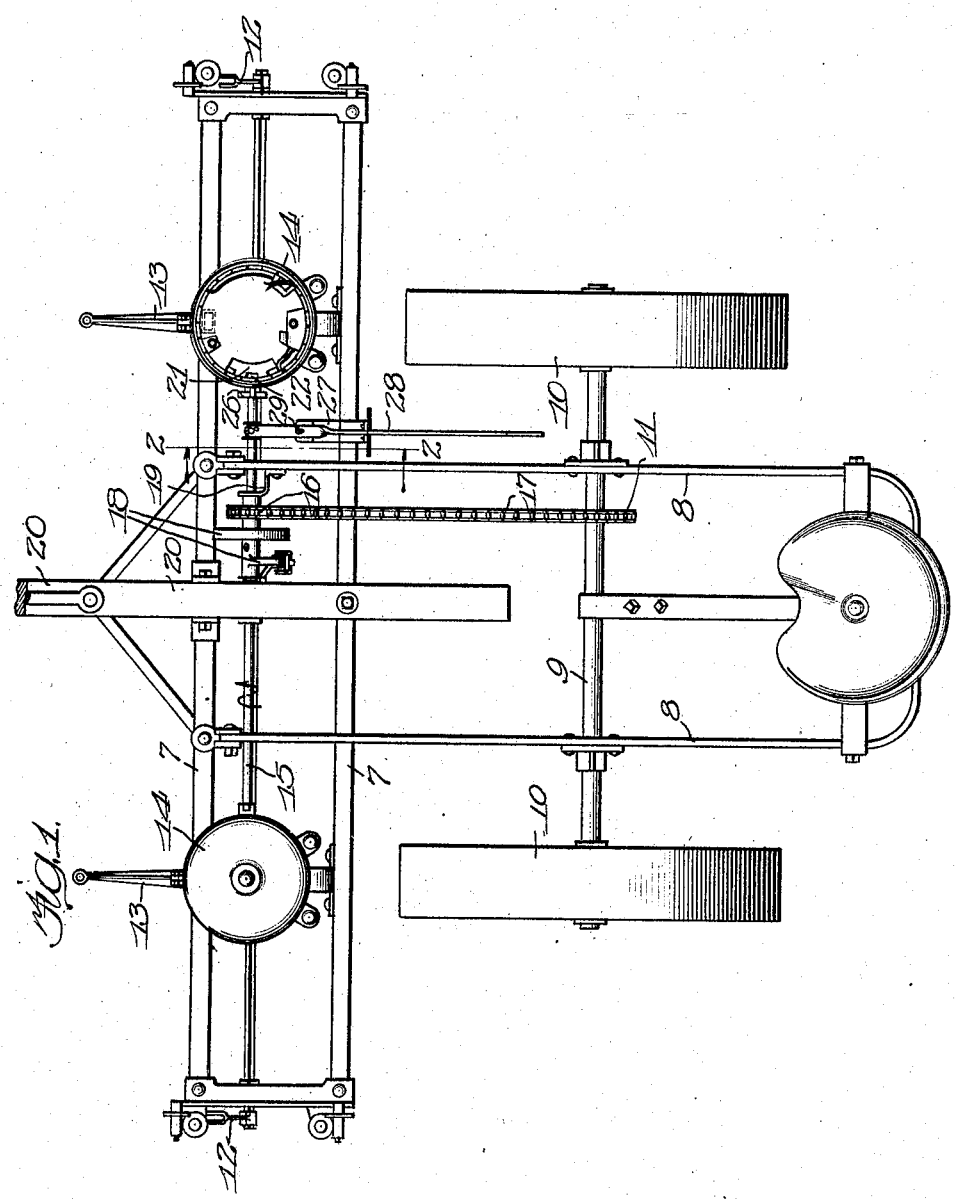

UNITED STATES PATENT OFFICE.

ERNST E. ENGLUND, OF MOLINE, ILLINOIS, ASSIGNOR TO D. M. SECHLER CARRIAGE COMPANY, OF MOLINE, ILLINOIS, A CORPORATION OF ILLINOIS.

CORN-PLANTER.

No. 918,983.

Specification of Letters Patent.

Patented April 20, 1909.

Application filed July 13, 1908. Serial No. 443,280.

*To all whom it may concern:*

Be it known that I, ERNST E. ENGLUND, a citizen of the United States, residing at Moline, in the county of Rock Island and State of Illinois, have invented certain new and useful Improvements in Corn-Planters, of which the following is a specification, reference being had to the accompanying drawings.

My invention relates to corn planters and particularly to that type of corn planter in which the seed-plate is actuated by power applied from the carrying wheels through the medium of a clutch mechanism thrown into engagement by the operation of the fork levers and automatically thrown out of engagement when a predetermined amount of rotation is reached.

More particularly still, it relates to corn planters of the above-described type in which the seed-plate contains seed-cells each adapted to receive a single grain of corn.

The object of my invention is to provide new and improved mechanism by which the amount of movement of the seed-plate with each operation of the check-rower mechanism may be varied so that a greater or lesser number of seed-cells may pass under the cut-off and over the discharge opening and thereby a varying amount of corn be deposited in each hill, the said mechanism being adapted to be controlled by the operator while the machine is running and without the changing of plates.

It is well known that the number of grains of corn which should be deposited in each hill will vary with the character of the soil, and as the soil varies in the same field, it is frequently desirable that the operator may be able to so manipulate the machine that without changing the plates the amount of seed deposited in each hill may be varied from time to time.

As I said above, it is the object of my invention to provide new and improved mechanism for this purpose, and, generally speaking, I accomplish this object by providing mechanism by which, with each operation of the actuating mechanism, the number of seed-cells in the seed-plate which pass over the discharge spout may be varied by giving a varying number of impulses to the seed-plate with each operation of the actuating mechanism.

In the accompanying drawings:—Figure 1 is a top or plan view of the planter. Fig. 2 is an enlarged detail section, being a view of a portion of the bottom of one of the seed-boxes, showing the actuating gears and the lever by which the gears are shifted. Fig. 3. is an enlarged detail, being a section on line 3—3 of Fig. 2. Fig. 4. is an enlarged detail, showing a part of the bottom of the seed-box in section, and the variable driving gears which actuate it. Fig. 5 is a section on line 5—5 of Fig. 4. Fig. 6 is a detail, being an isometric view of the oblong ring by which the shaft on which the driving gears are mounted is moved longitudinally in one direction or the other.

Referring to the drawings:—7 indicates the runner frame, and 8 the rear or wheel frame of the planter, both of the usual ordinary construction.

9 indicates an axle mounted in the wheel frame, and 10 indicates the wheels thereon.

11 indicates a sprocket wheel mounted on the axle 9.

12 indicates check-rower mechanism which may be of any approved form of construction carried at the ends of the runner-frame 7. The runner-frame is provided with the usual runners or furrow openers 13 and seed-boxes or hoppers 14.

15 indicates the seed-shaft which is rotatably and slidably mounted in suitable bearings on the runner-frame 7.

16 indicates a sprocket wheel which is loosely carried on the seed-shaft 15 and is driven by the sprocket chain 17 which passes over it and the sprocket wheel 11.

18 indicates a clutch of any well-known form and description which is feathered on the seed-shaft 15 so as to rotate therewith but to permit the seed-shaft 15 to slide longitudinally of itself in the frame. The clutch mechanism and the sprocket wheel are held against movement with the shaft 15 by a bracket 19 which bears upon the hub of the sprocket 16 and by the bearing of the clutch mechanism 18 against a suitable bearing adjacent to the tongue 20.

The clutch mechanism may be of any well-known kind adapted to be thrown into engagement with the sprocket wheel 16 by the throw of the fork levers, and, after having made one complete revolution, or a predetermined portion of a revolution as may be desired, to be automatically thrown out of engagement, rotating with it the seed-shaft 15. As this clutch mechanism may be of any appropriate kind, and as such clutch mechanism is now well-known, it is believed that it is unnecessary to describe it here, especially as it of itself forms no part of my present invention.

21 indicates seed-plates located in the bottom of the hoppers 14 in the usual manner, and having seed-cups 22 each adapted to contain a single grain of corn. The seed-plates 21 are preferably of what is known as the "edge-drop type", but may be of any other type adapted to receive in each seed-cell a single grain of corn.

23 indicates an annular plate which is rotatably mounted below the bottom of the hopper in any well-known and approved manner and is connected to the seed-plate 21 in any well-known way, as by pins 24, so that when the plate 23 is rotated the seed-plate will rotate with it.

25 indicates a number of teeth projecting downward from the periphery of the plate 23, as best shown in Figs. 2 and 4.

26 indicates a gear which is divided into three parts,—$26^a$, $26^b$, and $26^c$,—preferably all integral, and having respectively two teeth, three teeth, and four teeth, spaced equally distant from one another. That is to say, the teeth on the part $26^a$ are two in number arranged diametrically opposite each other,—the teeth on the part $26^b$ are three in number,—and the teeth on the part $26^c$ are four in number,—arranged equally distant from each other. One of these gears, 26, secured to the seed-shaft 15, is located below each of the seed-boxes, one at each end of the machine. The drawings show only one of these devices, as the other is an exact duplicate, except that it is arranged the other end to. That is to say, if as shown in Fig. 4 the four-toothed portion of the gear is toward the center of the machine, and the two-toothed portion toward the center of the seed-box, the gear upon the other end will be reversed in position so that the two-toothed end will be toward the center of the machine and the four-toothed end toward the center of the seed-box. These teeth are arranged substantially tangential of the gear wheel and are so arranged that when the seed-shaft is rotated as above described by the clutch mechanism, each tooth will give an actuating impulse to the seed-plate as it engages one of the teeth 25, and the number of impulses given to the seed-plate with each operation of the clutch mechanism will vary according to which of said gears engages the said teeth 25, thus varying the amount of rotation given to the seed-plate with each operation of the clutch mechanism, and consequently varying the number of seed-cells that pass under the cut-off with each operation of the check-rower mechanism.

27 indicates a bracket which is mounted upon the rear bar 7 of the runner-frame and branches into two arms $27^a$ and $27^b$.

28 indicates a lever which is pivotally mounted upon the upper end of the arm $27^a$ by means of a pin 29 which carries a spring 30 bearing at its lower end upon the upper surface of the lever 28 and at its upper end against a cotter pin 31 in the upper end of the pin 29.

32 indicates a notched rack-plate provided with as many notches 33 as there are different-toothed gears in the gear 26,—as shown in the drawings three in number,—which are adapted to engage the rear end of the lever 28 and lock it in any desired position, the lever being raised against the spring 30 when it is desired to shift it.

34 indicates a sleeve having a rounded oblong opening adapted to embrace the seed-shaft 15 and having a pin 36 projecting from its upper surface. The front end of the lever 28 is perforated to receive the pin 36 and is held in place thereon by a cotter pin 37. The sleeve 34 is held in place upon the shaft 15 by means of cotter pins 38, with washers 39 interposed between the cotter pins and the sleeve. By swinging the lever 28 to the right or left, it will be obvious that one portion or another,—$26^a$, $26^b$, or $26^c$,—of the gear 26 will be brought into registry with the teeth 25 on the plate 23, and when the shaft 15 is rotated by the operation of the clutch mechanism above described the seed-plate will be given a variable number of impulses according to whether the two-toothed gear $26^a$, the three-toothed gear $26^b$, or the four toothed gear $26^c$ is brought into engagement with the teeth 25.

The number of the teeth of the part 25 and the number of the gears will of course depend upon the desired variation of the movement of the seed-plate. As illustrated in the drawings herein, they are so related to one another and to the number of seed-cups in the seed-plate that when the two-toothed gear $26^a$ is brought into engagement with the teeth 25 the seed plate will be given two impulses and such an amount of rotation that two seed-cells will pass the cut-off with each operation of the clutch and actuating mechanism, thus causing two grains of corn to be deposited in each hill; that when the three-toothed portion $26^b$ is brought into engagement with the teeth 25 the seed-plate will be given three impulses to carry three seed-cells under the cut-off and over the discharge tube with each operation of the clutch and actuating mechanism; and that when the four-toothed portion 26ᶜ is brought into engagement with the teeth 25 the seed-plate will be given four impulses so as to cause four seed-cells to pass under the cut-off and over the seed discharge with each operation of the clutch and actuating mechanism. It will be obvious that in case it should be desired to vary these impulses and consequent amount of rotation of the seed-plate,— for instance, so as to deposit only one grain of corn in a hill, or to deposit five grains of corn in a hill,—the mechanism could be readily adapted thereto, and I therefore do not confine myself to a gear having the several parts containing the precise number of teeth above described, or to the dropping of two, three or four grains of corn only in each hill.

It will be seen from the above description of the mechanism that the seed-plate, instead of being given a steady and continuous partial rotation at each operation of the check-rower lever, is given a series of intermittent impulses which may be varied in number at the will of the driver, and that each of these impulses advances the seed-plate a sufficient distance to carry a single grain of corn under the cut-off. In other words, the seed-plate is given a series of jerks through the medium of the clutch with each throw of the check-rower mechanism, and the number of these jerks or impulses given to the seed-plate with each throw of the check-rower mechanism through the medium of the clutch may be varied by the driver without leaving his seat. One great advantage of giving to the seed-plate this series of intermittent impulses or jerks lies in the fact that this movement insures the filling of each seed-cell with a grain of corn much more perfectly than a steady and continuous partial rotation.

It will of course be understood that the planter is equipped with the usual cut-off mechanism in the hoppers, and the usual seed-tubes in the runner shanks, and with the usual runner valves operated by the check-rower mechanism. As these, however, may be of any appropriate kind, and are well known in the art, and as my invention does not in any way relate to them, I have not shown or described them.

What I claim as my invention and desire to secure by Letters Patent is:—

1. In a corn-planter, the combination with check-rower mechanism, a seed-plate, and means actuated by the check-rower mechanism for imparting to the seed-plate a series of intermittent impulses upon each actuation of the check-rower mechanism.

2. In a corn-planter, the combination with check-rower mechanism, a seed-plate, means actuated by the check-rower mechanism for imparting to the seed-plate a series of intermittent impulses upon each actuation of the check-rower mechanism, and means for varying the number of impulses given to the seed-plate by each operation of the check-rower mechanism.

3. In a corn-planter, the combination with check-rower mechanism, a seed-plate, means actuated by the check-rower mechanism for imparting to the seed-plate a series of intermittent impulses upon each actuation of the check-rower mechanism, and lever mechanism for varying the number of impulses given to the seed-plate by each operation of the check-rower mechanism.

4. In a corn-planter, the combination with check-rower mechanism, a seed-plate, clutch-mechanism driven by the progressive movement of the machine and adapted to be thrown into operative relation with each operation of the check-rower mechanism, and mechanism operated by said check-rower mechanism through the medium of said clutch-mechanism to give the seed-plate a series of intermittent impulses at each actuation of the check-rower mechanism.

5. In a corn-planter, the combination with check-rower mechanism, a seed-plate, clutch-mechanism driven by the progressive movement of the machine and adapted to be thrown into operative relation with each operation of the check-rower mechanism, mechanism operated by said check-rower mechanism through the medium of said clutch-mechanism to give the seed-plate a series of intermittent impulses at each actuation of the check-rower mechanism, and means for varying the number of impulses given to the seed-plate at each actuation of the check-rower mechanism.

6. In a corn-planter, the combination with check-rower mechanism, a seed-plate having seed-cups adapted each to contain a single grain of corn, and clutch-mechanism driven from the rear wheels and adapted to be thrown into operative relation at each operation of the check-rower mechanism, of means actuated by said check-rower mechanism through the medium of said clutch-mechanism for giving the seed-plate a series of intermittent impulses at each actuation of the check-rower mechanism.

7. In a corn-planter, the combination with check-rower mechanism, a seed-plate having seed-cups adapted each to contain a single grain of corn and clutch mechanism driven from the rear wheels and adapted to be thrown into operative relation with each operation of the check-rower mechanism, of a seed-shaft adapted to be actuated by said clutch mechanism and means operated by said seed-shaft and adapted to give to said seed-plate a variable number of intermittent impulses during the actuation of said seed-shaft.

8. In a corn-planter, the combination with check-rower mechanism, a seed-plate having seed-cups adapted each to contain a single grain of corn, and clutch mechanism driven from the rear wheels and adapted to be thrown into operative relation with each operation of the check-rower mechanism, of a gear-ring connected with said seed-plate, a seed-shaft adapted to be actuated by said clutch mechanism, and shiftable gearing operated by said seed-shaft and adapted to give to said seed-plate a variable number of intermittent impulses during the actuation of said seed-shaft.

ERNST E. ENGLUND.

Witnesses:
NANNIE C. BENELL,
CHAS. M. McCUTCHEN.